US006984870B2

(12) United States Patent
Kinayman

(10) Patent No.: US 6,984,870 B2
(45) Date of Patent: Jan. 10, 2006

(54) HIGH SPEED CROSS-POINT SWITCH USING SIGE HBT TECHNOLOGY

(75) Inventor: Noyan Kinayman, Malden, MA (US)

(73) Assignee: M/A-COM, Inc., Lowell, MA (US)

( * ) Notice: Subject to any disclaimer, the term of this patent is extended or adjusted under 35 U.S.C. 154(b) by 0 days.

(21) Appl. No.: 10/682,949

(22) Filed: Oct. 9, 2003

(65) Prior Publication Data
US 2004/0077120 A1    Apr. 22, 2004

Related U.S. Application Data

(60) Provisional application No. 60/419,648, filed on Oct. 18, 2002.

(51) Int. Cl.
*H01L 29/00* (2006.01)
(52) U.S. Cl. ..................................... 257/539; 340/2.29
(58) Field of Classification Search ................ 257/539; 340/2.29
See application file for complete search history.

(56) References Cited

U.S. PATENT DOCUMENTS

| | | | | |
|---|---|---|---|---|
| 3,132,210 | A | * | 5/1964 | Adelaar ...................... 370/442 |
| 4,897,645 | A | | 1/1990 | Hofmann ............... 340/825.91 |
| 5,001,474 | A | * | 3/1991 | Verbeek ..................... 340/2.29 |

FOREIGN PATENT DOCUMENTS

| DE | 40 10 283 A1 | 10/1991 |
|---|---|---|
| EP | 0 967 680 A2 | 12/1999 |

OTHER PUBLICATIONS

PTO 05-1831, Translation of German Patent No. 40 10 283 A1, Feb. 10, 1991, 13 pp.*
Arora R et al: "A monolithic 4*4 TIA crosspoint switch and laser driver IC with very high programming speed" ES-SCIRC 2002. pp. 499-502, XP008031184.
Kondo M et al: "Ultra$_{13}$ Low-Power and High-Speed Sige Base Bipolar Transistors Fro Wireless Telecommunication Systems" vol. 45, No. 6, Jun. 1, 1998, pp. 1287-1294, XP000754180.
Luy J-F et al: "Si/Sige MMIC's" IEE Transactions on Microwave Theory and Techniques, IEE Inc. New York, US, vol. 43, No. 4, Part 1, Apr. 1, 1995, pp. 705-714, XP000496274.
Shin H J et al: "An Experimental 5-GB/S 16×16 Si-Bipolar Crosspoint Switch" vol. 27, No. 12, Dec. 1, 1992, pp. 1812-1818, XP000329032.

* cited by examiner

*Primary Examiner*—Howard Weiss

(57) ABSTRACT

A high-speed cross-point switch is built on a preferably silicon substrate and uses bipolar transistor switching elements. Preferably, the bipolar transistors are SiGe bipolar junction transistors. Intersecting conductive input and output microstrips are preferably thinned at their intersections to reduce shunt capacitance between the coupled lines. It is also preferred that the input buffer be connected in cascode fashion with the switching transistors in order to create an amplification stage. The signal and its inverse are carried on balanced microstrip pairs in order to reduce electromagnetic field strength at the center of the balanced line pairs thereby improving isolation between two crossing balanced pairs.

11 Claims, 5 Drawing Sheets

HIGH SPEED CROSS-POINT SWITCH USING SIGE HBT TECHNOLOGY

CROSS REFERENCE TO RELATED APPLICATIONS

This application claims priority to U.S. provisional patent application Ser. No. 60/419,648 filed Oct. 18, 2002. The disclosure of that provisional patent application is fully incorporated by reference herein.

FIELD OF THE INVENTION

The present invention relates in general to high-speed cross-point switches, and more particularly to cross-point switches implemented using SiGe heterojunction bipolar transistors.

BACKGROUND OF THE INVENTION

Cross-point switches are commonly used in optical communication systems, test equipment, and transreceivers. Typical cross-point switch architecture is shown in FIG. 1. More particularly, high-frequency cross-point switches are commonly used in optical-millimeter wave-optical (OMO) switches. In OMO switches, the optical signal is first converted to a millimeter-wave (mm-wave) baseband signal. Then, switching is performed according to the requirements. Finally, the signal is converted to an optical wavelength again by modulating a laser diode. This scheme allows reshaping, retiming, and regenerating of signals easily because these functions are implemented in the electrical domain.

One critical requirement of this scheme is its very wide bandwidth. For a 40 GBit/s data rate, the cross-point switch must have a 3-dB bandwidth of at least 0.1 GHz to 25 GHz. After 25 GHz, the band should roll off smoothly.

Another important point concerns the distribution of bias lines to switching elements. Although for small switch sizes (2×2, 4×4) this can be manageable, for relatively large matrix sizes (16×16, 16×32) it can be extremely difficult or nearly impossible to distribute all of the biasing lines. Bias lines are used to activate and deactivate individual switching elements. In addition to this, DC power must also be supplied to switching elements if they consist of active elements.

Switch loss is a third important consideration. High-frequency passive cross-point switches that have a large number of RF inputs and outputs usually have high insertion losses. The high insertion loss stems from the fact that the transmission lines that form the matrix must be terminated, as with resistors, 10, to eliminate reflections that deteriorate the pulse shape (see FIG. 1). Provided that all of the lines have the same characteristic impedance and are terminated with the same impedance, this results in a minimum of 6 dB theoretical insertion loss for a high-frequency cross-point switch. Any losses due to signal transitions, metallization and lossy dielectrics would be on top of this figure. However, the absolute value of insertion loss is not the primary issue for optical switches as long as it remains above a critical level because the system has 3R (regenerate-reshape-retiming) functionality at some level. Therefore, 7–10 dB insertion losses are acceptable as long as the on/off insertion loss ratio is greater than approximately 30 dB at the highest operating frequency. On the other hand, although 7–10 dB insertion loss per switch matrix may be manageable, cascading such matrix elements to achieve higher port count matrices can become troublesome without inserting intermediate amplifier stages to boost up the signal level.

Although the absolute value of insertion loss is therefore not the paramount consideration for an optical switch in most of the cases, the coupling between the channels is. Therefore, the switching fabric must be designed to minimize channel-to-channel coupling.

A switch matrix using latching PIN diodes based on a GaAs process can address all of these issues successfully to some extent. Perhaps the main advantage of latching PIN diodes is the possibility of using RF lines to carry the switching signals (i.e., x-y addressing). This greatly reduces the requirements for bias lines. For instance, for a 16×16 switch, one would require 256 bias lines if it was attempted to bias each junction individually. However, if one uses latching diodes, then one would need only 32 bias lines, which can be the same as the RF lines. Latching PIN diodes have been employed in low frequency networks (i.e., telephony) for a long time. Employing a mm-wave latching PIN diode in a cross-point switch architecture has occurred relatively recently. Despite their advantages over conventional PIN diode switch matrices, GaAs latching PIN diode matrices have the following drawbacks: large circuit size, relatively high cost (i.e., low yield), difficulty in incorporating on-chip amplifiers, and difficulty in incorporating digital circuits.

SUMMARY OF THE INVENTION

During the last few years, SiGe technology has been increasingly used for high frequency applications. Although the silicon substrate has significantly higher dielectric loss than GaAs substrate, we have discovered that use of appropriate transmission lines that allow less concentration of electric fields in the substrate and transistors with high cut-off frequencies makes SiGe technology feasible for high-frequency applications. The present invention provides high-frequency cross-point switch matrices based on SiGe heterojunction bipolar transistor (HBT) technology, and methods of making and using same. In one aspect of the invention, balanced lines are used as transmission lines to and from the switch junctions in order to reduce the dielectric losses. Preferably, the transmission lines or microstrips have reduced widths at the intersection of rows and columns. Switching elements are preferably implemented using SiGe HBTs. The technology allows building large sizes of cross-point (16×16 and 32×32) switches up to 30 GHz. It is also possible to add input and output buffer amplifiers to improve isolation and provide additional gain, which provides significant advantage if one decides to cascade the switch matrices. In a preferred embodiment, the present invention includes an input buffer which, in combination with the switching transistors, acts as a cascode amplifier.

SiGe HBT-based cross-point switches offer significant technical advantages over latching PIN diodes on GaAs, including: i.) smaller circuit size, ii.) relatively low-cost in high-volumes, iii.) ability to incorporate amplifiers on the same chip, and iv.) ability to incorporate digital circuits on the same chip. The last two points are especially important because they allow the switch matrix to have gain, which makes it suitable for applications other than optical systems such as instrumentation, and the ability to use HBTs instead of latching PIN diodes as switching elements, respectively. Providing gain is important because, as indicated before, there is an inherent loss due to the termination resistors. Incorporating digital circuits provides the ability of using RF lines as bias lines similar to those used for latching diodes.

BRIEF DESCRIPTION OF THE DRAWINGS

Further aspects of the invention and their advantages can be discerned from reading the following detailed description when taken in conjunction with the drawings, in which like characters denote like parts and in which.

DETAILED DESCRIPTION OF ILLUSTRATED EMBODIMENTS

Figure 1:
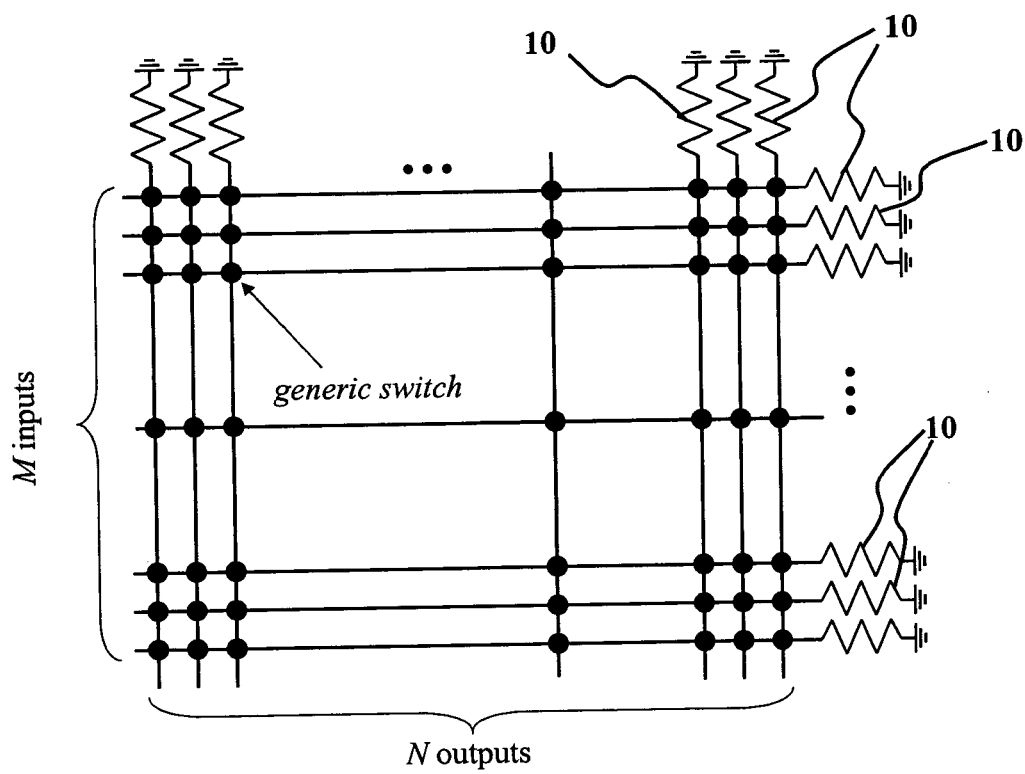
FIG. 1 is a schematic topology of an N×M high frequency cross-point switch according to the prior art.
Figure 2A:
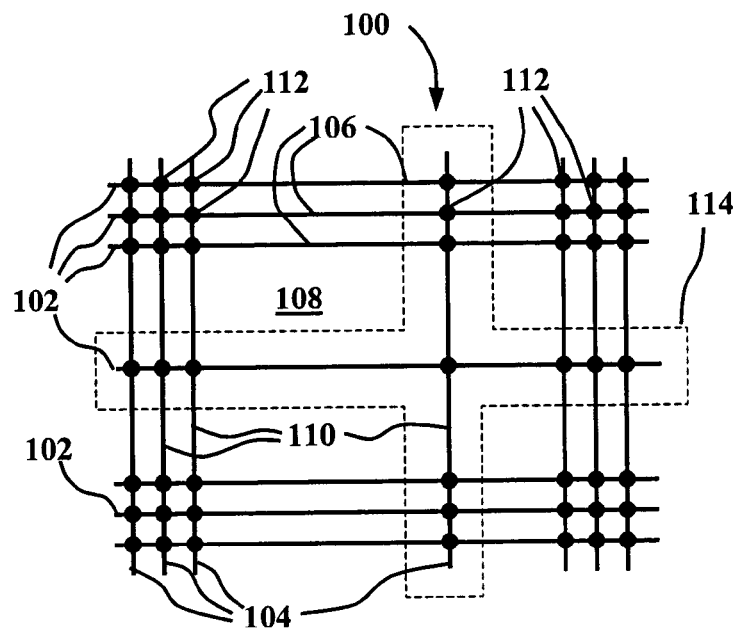
FIG. 2A is a high level schematic diagram of a cross-point switch implemented according to the invention.

With reference to FIG. 2A, an M×N switch matrix indicated generally at 100 has M inputs (rows), 102, and N outputs (columns), 104. The M inputs, 102, introduce one or more signals to be switched onto a plurality of conductive microstrips, 106, which are arranged to extend in parallel in one direction over the face of a substrate, 108, such as a semiconductor substrate. A second set of conductive microstrips, 110, run in parallel over the face of the substrate, 108, at an angle to microstrips, 106, preferably at 90° thereto. A plurality of switching elements, 112, are formed at respective intersections of the input microstrips, 106, and the output microstrips, 110. These switching elements, 112, are selectively operated to connect ones of the inputs, 102, to ones of the outputs, 104, thereby being capable of switching signals input on the inputs, 102, to the outputs, 104, as desired.

Figure 2B:
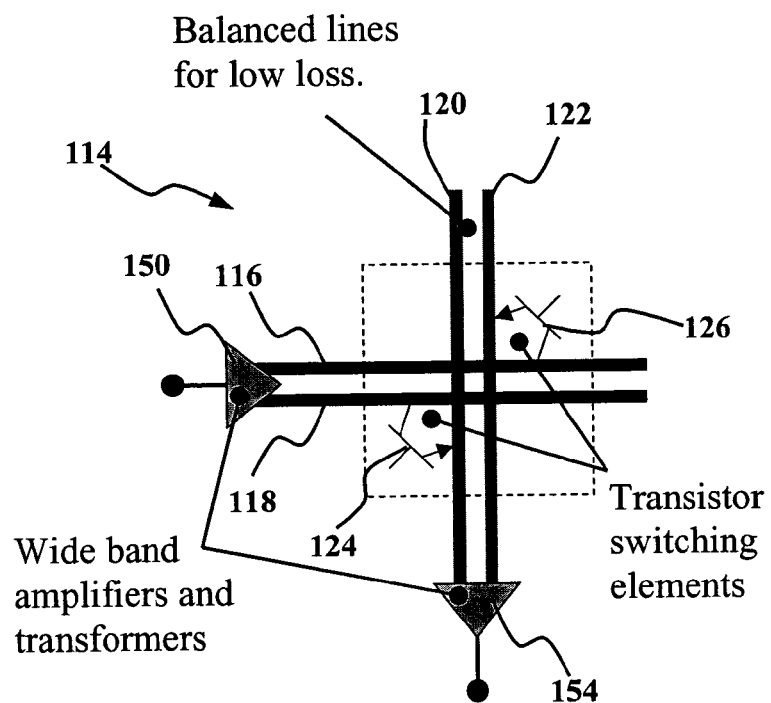
FIG. 2B is a lower level schematic detail of the cross-point switch shown in FIG. 2A.

The M×N switch matrix, 100, as shown in FIG. 2A is conceptual in that a single microstrip, 106, is shown for each input line and a single microstrip 110 is shown for each output line. A preferred, actual structure is shown in FIG. 2B. For each input signal source there are actually a pair of microstrips 116, 118 and for each output signal path there are a pair of microstrips 120, 122. The microstrips as described herein may be formed from any suitable materials, such as metal. The techniques of depositing such metalization are very well known to a person skilled in the art. The microstrip 116 will carry a signal and accompanying microstrip 118 will carry its inverse, or an identical signal of opposite polarity. Therefore, the electromagnetic fields generated by the signals carried by microstrips 116 and 118 will largely cancel out at the geometric center of those two lines. Microstrips 116 and 118 are said to be balanced with respect to each other. Similarly, output microstrip pair 120, 122 will carry an output signal and its inverse. The transistor switching elements 124 and 126, formed at an intersection of pairs 116, 118 and 120, 122, are controlled to simultaneously connect input line 116 to output line 122 and input 118 to output line 120.

The use of balanced microstrip line pairs resolves one problem with the use of SiGe switching transistors, because the silicon substrates in which these transistors are implemented typically have a relatively high conductivity, such as 0.05 Siemens/meter. This increases the losses experienced by regular microstrip lines because they use the silicon substrate as an insulating dielectric. The use of balanced lines 116, 118; 120, 122 reduces dielectric losses and circuit size since the field components of balanced lines such as those illustrated are mostly concentrated in the vicinity of the lines themselves, and therefore the relatively highly conductive silicon substrate (as opposed to, say, GaAs) does not cause as much loss as it would in an unbalanced regular microstrip line architecture. As an alternative to using a dual-line, balanced architecture, the present invention may employ an intervening oxide layer to use as a microstrip substrate above the SiGe substrate. In this case, the surface of the SiGe substrate must be metalized appropriately to form a microstrip line medium. For this approach to be viable, relatively thick (at least 10 micrometer) oxide layers preferably is employed to insulate the conductive microstrips from the substrate so that the width of the resulting microstrip lines is sufficiently wide for a 50 Ohm characteristic impedance. Otherwise, conductor losses increase significantly.

Figure 3:
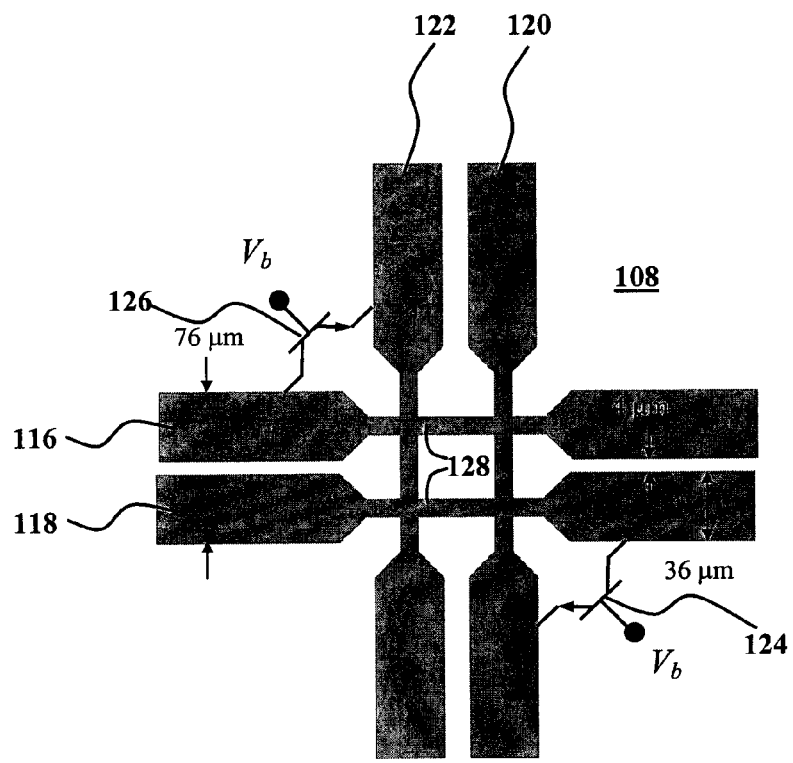
FIG. 3 is a plan view of a detail of a cross-point switch matrix, showing HBT connections and an intersection of microstrip pairs with narrowed sections according to one aspect of the invention.

Another advantage of using balanced lines 116, 118; 120, 122 as a cross-point switch architecture is that the isolation between two balanced lines which overpass each other at a right angle approaches infinity. FIG. 3 illustrates a preferred embodiment of the microstrip pairs in the vicinity of their intersection with each other. Each of the conductive microstrips, 116–122, has a general width and a general separation from each other as they extend across the face of the substrate, 108. In the illustrated embodiment, the general width of the conductive microstrip is 36 micrometers while their separation at places other than the intersections are about 4 micrometers. However, the width of the microstrips 116–122 preferably is considerably narrowed in the vicinity of their intersections with other microstrips. A width of the narrowed portions 128 may be, for example, on the order of 4 micrometers. The narrowed portions 128 minimizes the shunt capacitance between the balanced lines improving the VSWR.

Switching transistors, 124, 126, preferably are SiGe heterojunction bipolar transistors. Preferably, the transistor 124, 126 have SiGe alloy bases formed between (1) typically silicon collectors and (2) emitters which, for example, may be formed of highly doped polycrystalline silicon. The bases of transistors 124, 126 are connected as control electrodes, while the path between the emitter and collector of each such transistor forms a signal current path. The SiGe bases may, for example, be graded alloys of silicon and germanium. The construction of SiGe heterojunction bipolar transistors is very well known to a person skilled in the art.

Figure 4:
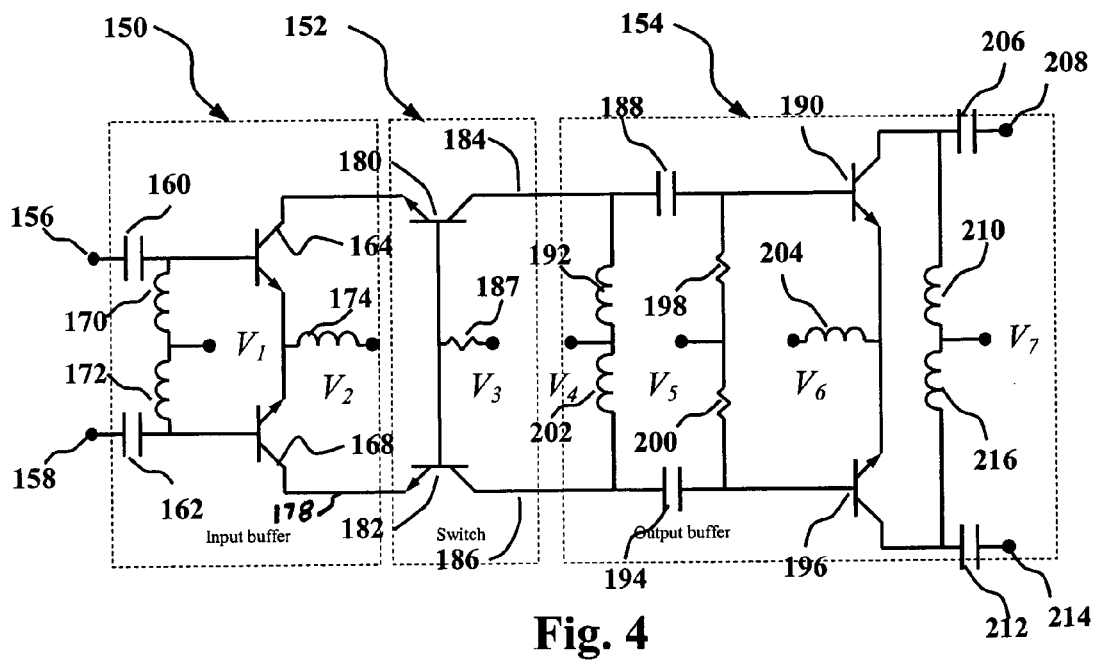
FIG. 4 is a schematic electrical diagram showing elements of an input buffer, HBT switching pair and output buffer according to a further aspect of the invention.

Input and output buffers for use with the present invention are illustrated in the circuit diagram of FIG. 4 with the inclusion of switching elements for a typical signal path. Shown are an input buffer, 150, an HBT switching pair, 152, and an output buffer, 154. For an M×N matrix, there are M input buffer circuits, 150, M×N switches 152 and N output buffers, 154. The input buffer, 150, has positive and negative going input signal lines, 156 and 158, which are connected through series capacitors, 160 and 162, respectively, to the bases of differential transistor pair, 164 and 168. An inductor, 170, connects the base of transistor 164 to a voltage reference $V_1$, while an inductor, 172, connects the base of transistor 168 to $V_1$. The emitters of the transistors 164 and 168 are connected in common through an inductor, 174, to a voltage reference $V_2$. The outputs of input buffer stage, 150, appear on microstrip transmission lines 176 and 178, respectively, the ends of which are connected to the collectors of bipolar transistors 164 and 168.

Preferably SiGe HBT switching transistors 180 and 182 are formed at the intersection of a balanced microstrip input transmission pair 167 and 168 and a pair 184 and 186 of output microstrip signal transmission lines. The input transmission lines 176 and 178, which carry signals that are reversed from each other, are connected to the respective emitters of transistors 180 and 182 forming a cascode pair with the input transistors, 160, 162. The bases of these transistors 180 and 182 are connected to a switching voltage $V_3$ through a resistor 187, which is the same as voltage $V_B$ shown in FIG. 3. Because transistor 180 is connected in cascode fashion to transistor 164, and because transistor 182 is connected in cascode fashion to transistor 168, the input buffer/switch combination shown results in a signal gain.

The balanced output microstrip transmission line pair 184 and 186 then proceeds preferably to the periphery of the integrated circuit die, where they enter an output buffer, 154. Signal line, 184, is connected through a capacitor, 188, to the base of a bipolar transistor, 190. Signal line 184 is also connected through an inductor 192 to a voltage reference $V_4$. In a similar fashion, output signal line 186 is connected through a series capacitor, 194, to the base of a transistor, 196. The base of transistor 190 is connected through a resistor, 198, to a voltage reference $V_5$. Similarly, the base of transistor 196 is connected through a resistor, 200, to voltage reference $V_5$. Output signal line 186 is connected via an inductor, 202, to voltage reference $V_4$.

The emitters of transistors 190 and 196, which operate as a differential pair, are connected in common via an inductor 204 to a voltage reference $V_6$. The collector of transistor 190 is connected through a capacitor, 206, to an output terminal 208, and via an inductor, 210, to a voltage reference $V_7$. The collector of transistor 196 is connected via a capacitor, 212, to an output 214, and via an inductor 216 to the voltage reference $V_7$.

Figure 5A:
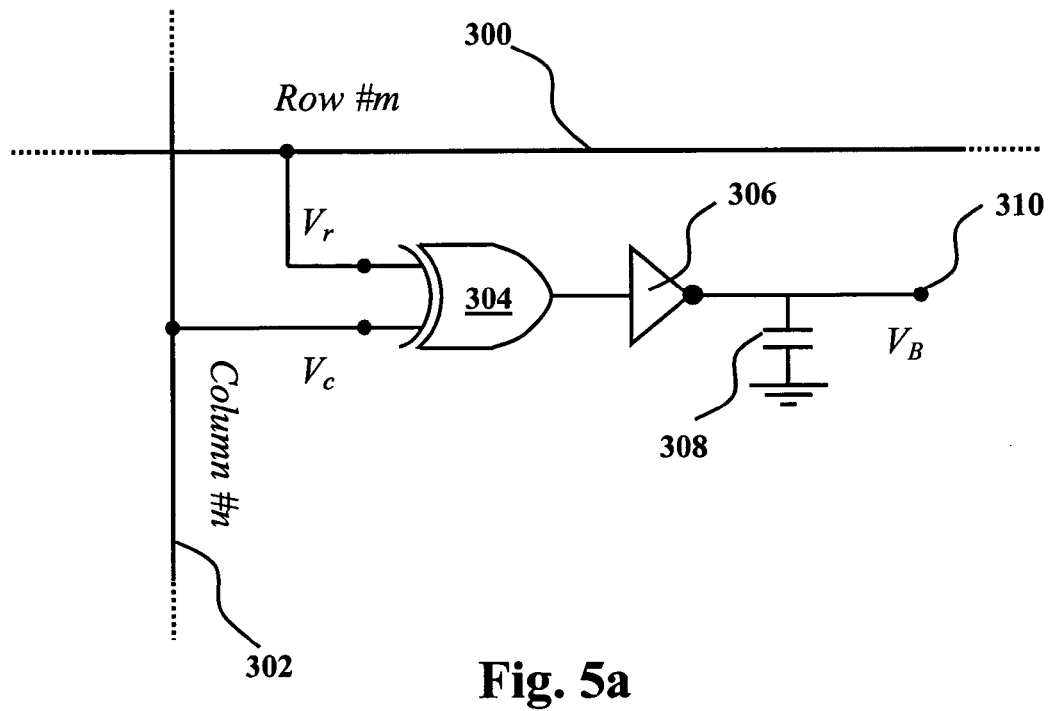
FIG. 5A is a schematic electrical diagram showing switching element addressing circuitry according to one embodiment of the invention.
Figure 6A:
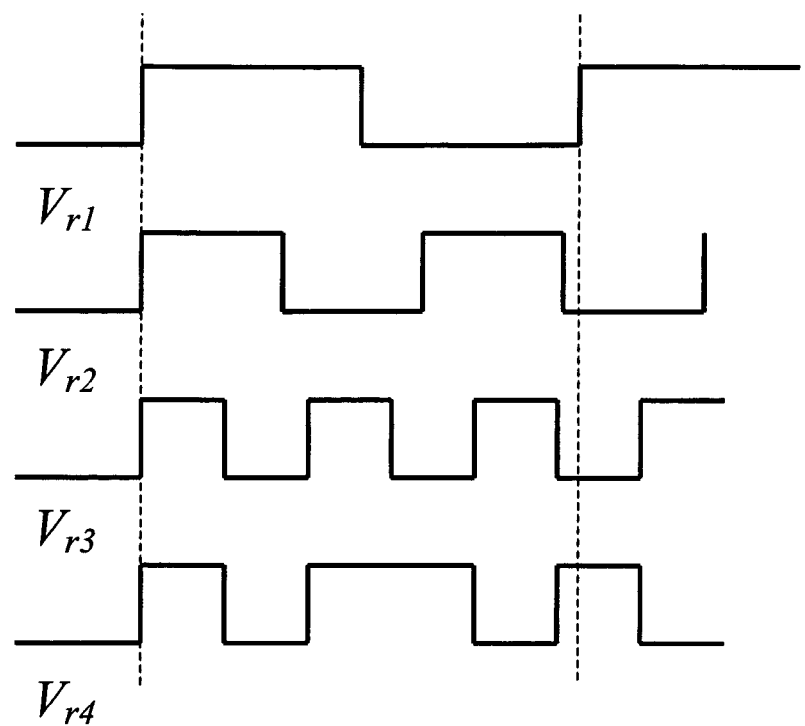
FIG. 6A is a timing diagram illustrating switching waveforms used by the switching element addressing circuitry shown in FIG. 5A.

There are many possible configurations of addressing logic circuits which could be used to select the HBT switching transistors. Two addressing logic circuits are disclosed here. An integrator approach is shown in FIG. 5A. A switching waveform is applied to a row control line 300, while a further waveform is applied to column control line 302. For both the rows and columns, the switching waveforms applied to them will be different according to the row selected. FIG. 6A shows switching waveforms for four such rows.

The waveforms from the row and column control lines are fed as inputs to an exclusive or (XOR) gate 304. The XOR gate is used to take the scalar product of the two signals fed by row and column. The scalar product of signals 300 and 302 is inverted by inverter 306 and the result integrated by the use of capacitor 308. The result is the switching signal $V_b$ or $V_3$ made available at terminal 310. If the row and column signals are exactly equal to each other, then one can expect maximum voltage at the capacitor output 310. However, if the row and column signals are different, then the voltage at the capacitor output 310 drops. For instance, if the voltages are 180° out of phase, then ideally the voltage $V_b$ at terminal 310 become zero. By carefully selecting the switching waveforms, one can selectively activate any junction or intersection in the switch matrix. The advantage of the approach illustrated in FIGS. 5A and 6A is that it requires relatively fewer logic circuits per junction. The disadvantage is that the switching signals must be applied continuously to keep the junctions on.

Figure 5B:
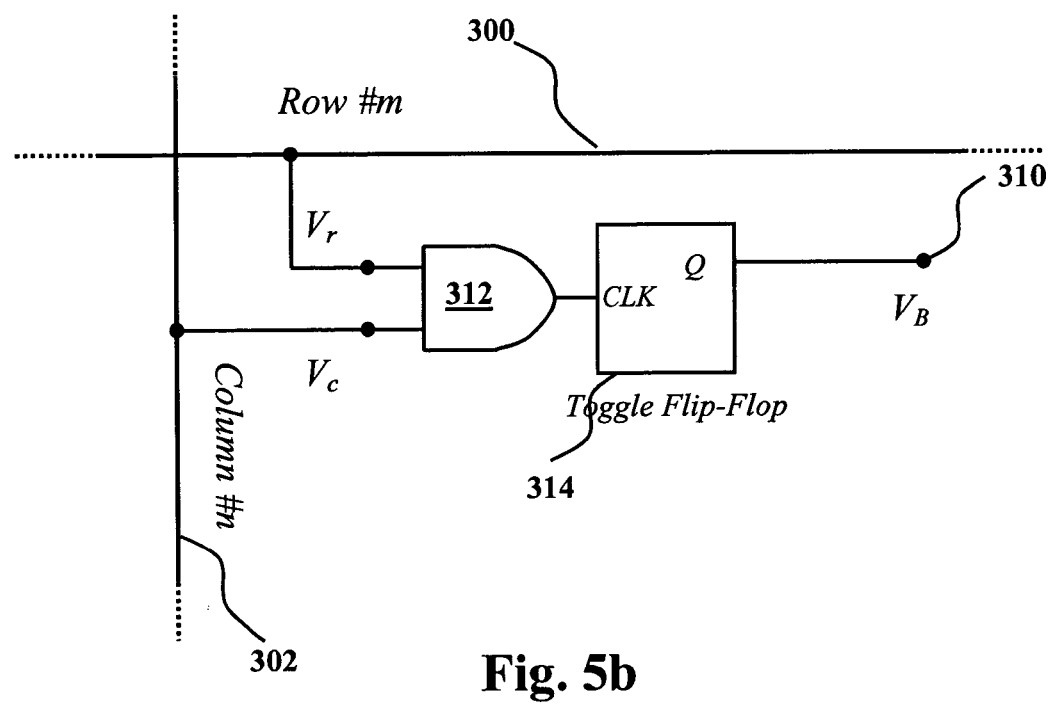
FIG. 5B is a schematic electrical diagram showing switch element addressing circuitry according to another embodiment of the invention.
Figure 6B:
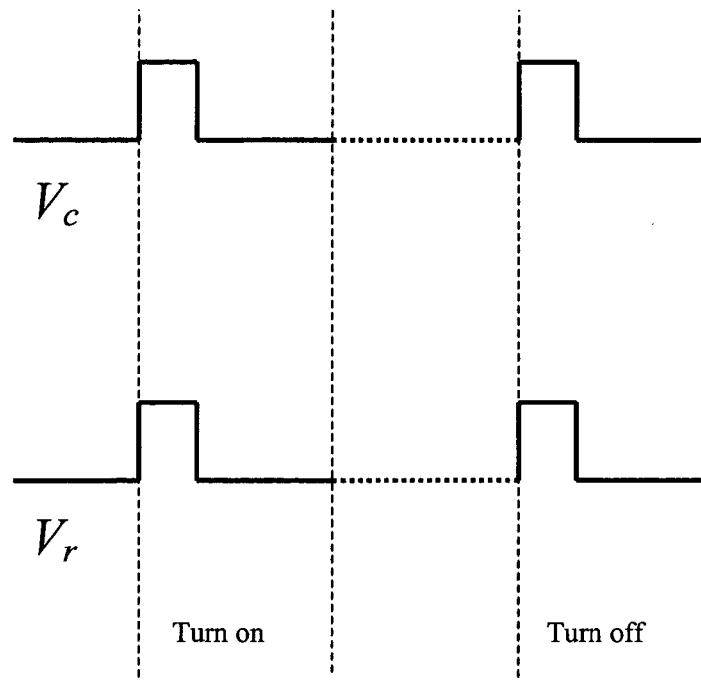
FIG. 6B is a timing diagram of waveforms generated in conjunction with the addressing circuitry illustrated in FIG. 5B.

A second approach is shown in the circuit diagram of FIG. 5B and the accompanying timing diagram shown in FIG. 6B. In this logic circuit, the row signal waveform on control line 300 and the column signal waveform on control line 302 are fed as inputs to an AND gate, 312, the output of which is connected to a clock input of a toggle flip-flop 314. A Q output of the toggle flip-flop 314 becomes the switching transistor biasing voltage available at output 310. As shown in FIG. 6B, switching pulses are applied each time that it becomes necessary to change the state of a particular junction. This approach requires much simpler switching waveforms than the scheme illustrated in FIGS. 5A and 6A. The advantage of this approach is that the switching waveforms do not need to be applied continuously. The disadvantage is that it is now necessary to include a toggle flip-flop 314 for each junction, which increases the circuit complexity. In a third approach (not shown), a shift register arranged in a meander fashion can be implemented to activate the shifting elements. This approach, however, would require significantly more digital real estate than using RF lines alone.

In FIGS. 5A and 5B, the switching signal available at terminal 310 is carried to the bases of the various switching transistors by RF lines.

In summary, a cross-point matrix has been shown and described which preferably uses SiGe HBT switching elements, narrows the width of the microstrips at the intersection of the input and output balanced pairs, and provides a cascode amplifier by the interaction of the input buffer and the paired switching elements. While preferred embodiments of the invention have been described in the detailed description and illustrated in the drawings, the invention is not limited thereto but only by the scope and spirit of the appended claims.

I claim:

1. A cross-point switch, comprising:
   a semiconductor substrate having a face;
   a plurality of conductive elongate parallel input microstrips formed to extend over the face in a first direction and having a first general width substantially uniform along their lengths;
   a plurality of conductive elongate parallel output microstrips formed to extend over the face in a second direction at an angle to the first direction, the output microstrips having a second general width substantially uniform along their lengths, the output microstrips and the input microstrips intersecting at a plurality of intersections;
   widths of the input and output microstrips in the vicinity of their intersections with each other being narrowed from the first and second general widths, respectively; and
   switches formed at the intersections of the input microstrips and the output microstrips and controllable to connect ones of the input microstrips to ones of the output microstrips.

2. The cross-point switch of claim 1, wherein each of the switches includes a heterojunction bipolar transistor.

3. The cross-point switch of claim 2, wherein the heterojunction bipolar transistor has a base including Germanium.

4. The cross-point switch of claim 1, wherein the input microstrips and the output microstrips are each formed in balanced pairs for transmission of like signals of opposite polarities, and for each intersection of microstrip pairs, a first input microstrip is switchably connected to a first output microstrip by a first switch, and a second input microstrip is switchably connected to a second output microstrip by a second switch.

5. A cross-point switch, comprising:
a semiconductor substrate having a face;
a plurality of conductive parallel input microstrips formed to extend over the face in a first direction;
a plurality of conductive parallel output microstrips formed to extend over the face in a second direction at an angle to the first direction;
switching transistors formed at intersections of the input microstrips and the output microstrips, each of the switching transistors having a control electrode; and
a controller operable to connect ones of the input microstrips to ones of the output microstrips by impressing a predetermined control voltage on control electrodes of respective switching transistors, the controller including:
a plurality of row control signal lines carrying respective row control signals;
a plurality of column control signal lines carrying respective column control signals;
a plurality of XOR gates provided for each possible combination of a row control signal with a column control signal, each XOR gate having associated therewith:
an output coupled to an inverter, an output of the inverter coupled to an integrator, an output of the integrator made available as the control voltage for at least one switching transistor coupling the row and column selected by the row and column control signals.

6. The cross-point switch of claim 5, wherein the input microstrips and output microstrips each are provided in pairs of first and second microstrips, the first microstrips connectable to carry a switched signal and the second microstrips connectable to carry an inverse of the switched signal, pairs of first microstrips intersecting pairs of second microstrips at pair intersections; and at each pair intersection, a first switching transistor controllable to connect a first input microstrip to a first output microstrip, a second switching transistor controllable to connect a second input microstrip to a second output microstrip, a control voltage signal from the controller coupled to control electrodes of the first and second switching transistors.

7. The cross-point switch of claim 5, wherein the switching transistors are SiGe heterojunction bipolar transistors.

8. A cross-point switch, comprising:
a semiconductor substrate having a face;
a plurality of conductive parallel input microstrips formed to extend over the face in a first direction;
a plurality of conductive parallel output microstrips formed to extend over the face in a second direction at an angle to the first direction;
switching transistors formed at intersections of the input microstrips and the output microstrips, each of the switching transistors having a control electrode; and
a controller operable to connect ones of the first microstrips to ones of the second microstrips by impressing a predetermined control voltage on control electrodes of respective switching transistors, the controller including:
a plurality of row control signal lines;
a plurality of column control signal lines;
a plurality of AND gates for each possible combination of a row control signal and a column control signal, each AND gate having associated therewith:
a toggle flip-flop having a clock input coupled to an output of the AND gate, and
a Q output of the toggle flip-flop generating the predetermined control voltage for at least one switching transistor.

9. The cross-point switch of claim 8, wherein the input microstrips and output microstrips each are provided in pairs of first and second microstrips, the first microstrips connectable to carry a switched signal and the second microstrips connectable to carry an inverse of the switched signal, pairs of first microstrips intersecting pairs of second microstrips at pair intersections; and at each pair intersection, a first switching transistor controllable to connect a first input microstrip to a first output microstrip, a second switching transistor controllable to connect a second input microstrip to a second output microstrip, a control voltage signal from the controller coupled to control electrodes of the first and second switching transistors.

10. A cross-point switch, comprising:
a plurality of elongate conductive parallel input microstrips extending over a face of a semiconductor substrate in a first direction;
a plurality of elongate conductive parallel output microstrips extending over the face of the semiconductor substrate in a second direction at an angle to the first direction and intersecting the input microstrips at intersections;
for ones of the intersections, respective switches each including a bipolar transistor, an emitter-collector current path of the bipolar transistor selectively coupling an input microstrip to an output microstrip; and
an input buffer terminating ends of the input microstrips, at least one bipolar transistor of the input buffer forming a cascode amplifier with the bipolar transistor of said switch.

11. The cross-point switch of claim 10, wherein the input microstrips are provided in pairs of first and second input microstrips and the output microstrips are provided in pairs of first and second output microstrips, pairs of input microstrips intersecting pairs of output microstrips at pair intersections, the first microstrips connectable to carry signals and the second microstrips connectable to carry inverses of the signals appearing on corresponding ones of the first microstrips;

for each pair intersection, a first bipolar transistor having a collector-emitter path selectively connecting a first input microstrip to a first output microstrip, and a second bipolar transistor selectively connecting a second input microstrip to a second output microstrip;

pairs of bipolar transistors of the input buffer forming cascode amplifiers with said first and second bipolar transistors of the pair intersections, said pairs of bipolar transistors in the input buffer coupled together to form a differential amplifier.

* * * * *